March 17, 1970   J. DEKKER ET AL   3,500,517
PROCESS AND APPARATUS FOR FIBRILLATING AND CRIMPING FILMS
Filed March 20, 1968   2 Sheets-Sheet 1

INVENTORS:
JAN DEKKER
GERRIT SCHUUR
BY: *Martin S. Baer*
THEIR ATTORNEY

United States Patent Office 3,500,517
Patented Mar. 17, 1970

3,500,517
PROCESS AND APPARATUS FOR FIBRILLATING AND CRIMPING FILMS
Jan Dekker and Gerrit Schuur, Delft, Netherlands, assignors to Shell Oil Company, New York, N.Y., a corporation of Delaware
Filed Mar. 20, 1968, Ser. No. 714,500
Claims priority, application Great Britain, Mar. 20, 1967, 12,967/67
Int. Cl. D02g 1/10
U.S. Cl. 28—1.5
8 Claims

ABSTRACT OF THE DISCLOSURE

Fibrillated structures suitable for textile use are produced from thermoplastic film by passing a moving band of such film, uniaxially oriented in the direction of movement, into brief contact with cutting projections arranged in rows at substantially right angles to the direction of film movement and moving in the direction of film movement at the point of contact at a linear speed at least twice that of the film, contact being limited to no more than two rows of cutting projections at one time. The cutting projections may be the points of serrated knife-blades or of rows of pins.

---

It is known that thermoplastic films with uniaxial molecular orientation can be split in the direction of the orientation by mechanical treatments, such as brushing, twining or causing the film to pass over a rough surface, for instance, sand paper, Such processes are known as fibrillation; the product is called fibrillate. The fibrillate consists of thin strips and fibers, usually interconnected and thus constituting a reticulated structure.

If a film strip is passed under tension over a sharp rim, high shearing forces being thus exerted at one side of the strip, unequal stretching and orientation may result; and, as a consequence thereof, internal tensions cause the strip afterwards to curl, helically or spirally, an effect which is usually called crimping. In the fibrillation described above, the crimping effect, if any, is only slight.

According to the present invention, fibrillation of thermoplastic films can be obtained in a convenient and continuous way by passing strips of thermoplastic film, having substantially uniaxial molecular orientation in the longitudinal dimension of the strips, over a moving body having rows of cutting projections, said rows of cutting projections moving in an arcuate path, e.g., a closed circular path, and hitting the film strip and cutting or scratching it substantially in the direction of motion of the film strip, the film strip having contact with at most two successive rows of cutting projections at a time.

The cutting projections may be the teeth of a serrated knife edge or they may be pins. They may be made of any solid material sufficiently hard and rigid to scratch the thermoplastic film, e.g., metal, ceramic material, or glass.

The moving body having rows of cutting projections may be, for example, a rotating prism with serrated edges parallel to and equidistant from the axis of rotation, or it may be an assembly of serrated knives or rows of pins mounted on a rotating axle, on a rotating cylinder or on an endless belt.

FIGURES 8a, 8b, 8c, and 8d are enlarged sections, in elevation, of serrated edges useful in the practice of this invention.

Figure 1A:
FIGURES 1a through 1h are schematic sectional views of bodies adapted to carry serrated edges for use in this invention.
Figure 1B:
Figure 1C:
Figure 1D:
Figure 1E:
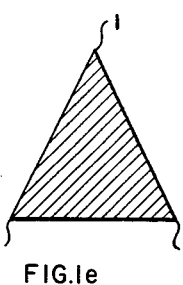
Figure 1F:
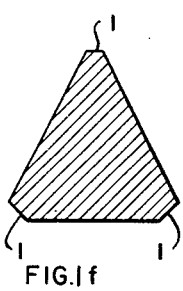
Figure 1G:
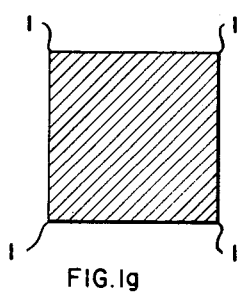
Figure 1H:
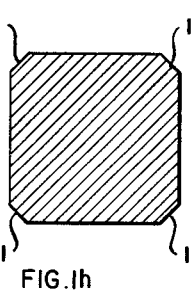

In a preferred mode of practicing this invention, the cutting projections which contact the moving film are serrated knife-edges. The body having said serrated edges is referred to herein as a serrated knife. A number of shapes of bodies suitable for carrying the knife-edges are illustrated in schematic section of FIGURE 1. In each illustration, the location of the knife-edge is designated by the numeral 1. Knives of triangular rectangular, and trapezoid cross-section are shown in FIGURES 1a, 1b, and 1d, respectively. A rectangular body with triangular edge is shown in FIGURE 1c. FIGURES 1e, 1f, 1g, and 1h illustrate triangular and rectangular prisms with sharp and slightly flattened edges, respectively. Each edge, whether sharp or flattened, suitably carries one row of prismoidal teeth of the type illustrated in FIGURE 3.

Figure 2:
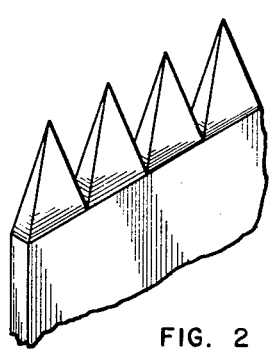
FIGURES 2, 3, 4 and 5 are perspective views of serrated knives suitable for use in this invention.
Figure 3:
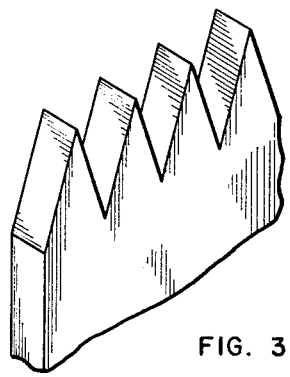
Figure 4:
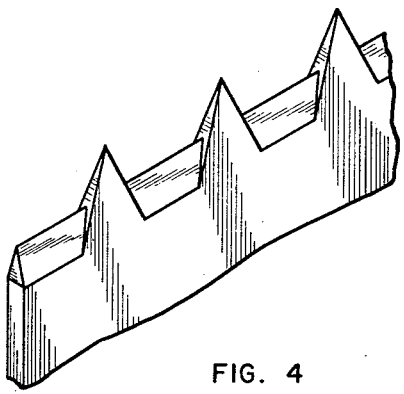
Figure 5:
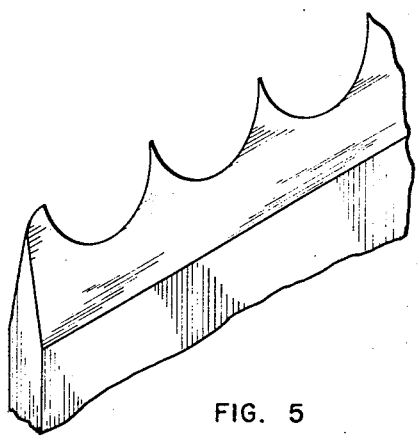

The serrated edges are provided with teeth, in most cases alternating with notches, grooves, or incisions. The teeth and notches may have various shapes. The teeth may be similar to cones, to pyramids, or to prisms. The parallel edges of prismoidal teeth should substantially coincide with the direction of film when the teeth are in contact therewith. In a cross section through a lateral plane adjacent to a serrated edge or in a cross section along the blade of the knife, the teeth usually show in triangular shape as saw teeth and the notches shown in shapes such as triangles, trapezoids, or semicircles. FIGURES 2 through 5 illustrate suitable shapes of teeth and notches. FIGURE 2 shows pyramidal teeth, FIGURE 3, prismoidal teeth. The notches in FIGURES 2 and 3 are of triangular cross section. FIGURE 4 shows a knife having pyramidal teeth and prismatic notches. FIGURE 5 shows pointed cogs and notches of semicircular cross section in elevation.

If the bottom of notches as shown in FIGURES 4 and 5 (the space between cutting projections of one row) has a sharp rim which is perpendicular to the direction of motion of the film strip as in FIGURES 4 and 5, or forms a sharp angle with said direction, such a rim causes a crimping or curling of the fibrillated material. In this way fibrillation and crimping are achieved simultaneously.

The edge of the knife has a width (perpendicular to the longitudinal dimension of the edge) which, of course, is smaller according as the knife is sharper. This width as a rule should not exceed 1 mm., and preferably not exceed 0.5 mm. This is because the film strip passing over the edge should not be supported over a larger distance than 1 mm. in the direction of its motion and preferably not over a distance larger than 0.5 mm.

The height of the teeth or the depth of the notches is preferably of the same order of magnitude as, or one order of magnitude larger than, the thickness of the film strip treated. Generally the height of the teeth should exceed neither 1 mm. nor 10 to 100 times the thickness of the film strip. The films are usually of a thickness of between 0.005 and 0.1 mm., preferably between 0.01 and 0.05 mm.

The width of the teeth and the notches in the longitudinal dimension of the serrated edges is generally of the same order of magnitude as the height of the teeth. The width of the notches may be larger than the depth, for instance, up to 5 or 10 times the depth or more. There may be cases in which it is advantageous to use teeth which are smaller in width than the notches in between. The spacing of teeth or pins in the longitudinal dimension of the serrated edges or rows of pins is suitably such as to provide between 5 and 100 and preferably between 10 to 50 teeth per centimeter.

The knives are usually arranged with their edges substantially perpendicular to the direction of motion of the film strips. It is essential in the present invention that at most two successive rows of cutting projections (e.g., serrated edges) are in contact with the film strip at a time. Preferably not more than one row of cutting projections or one serrated edge is in contact with the film strip at a time. If more than two successive rows were in contact with the film strip simultaneously, the hitting action would be lost and the effect of the treatment would be greatly reduced.

The spacing between rows of cutting projections and the relative linear velocity of film and cutting projections is coordinated such that successive contacts join and, generally, overlap. This is easily achieved with speeds of the cutting projection at the point of contact at least twice that of the film. A suitable range of cutting edge speeds is from 2 to 20 times and a preferred range from 3 to 10 times that of the film at the point of contact.

The linear velocity of the film strip as it passes the cutting projections is usually between 2 and 200 m./min. The linear velocity of the cutting projection at the point of contact is preferably between 10 and 1500 m./min., but always larger than that of the film strip.

In order to cause a sequence of serrated edges to hit the film strip, several arrangements may be applied. Simple and effective are knives with three- or four-cornered cross sections as shown in FIGURES 1e–h. Usually the axis of rotation is parallel to the serrated edge, but another arrangement, i.e., with a sharp angle between the directions of the serrated edge of a knife and the axis is possible. The direction of motion of a serrated edge when contacting the film strips should, however, substantially coincide with the direction of motion of the film strips.

Figure 6:
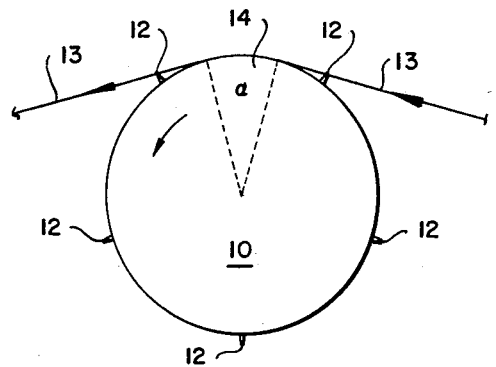
FIGURE 6 is a schematic diagram of one method of contacting a running strip of film with a cylinder carrying serrated knives.

In an alternative arrangement, one or more rows of cutting projections (serrated knives or rows of pins), usually not more than 12, may be fitted on the circumference of a rotating roll or wheel. When using a rotating roll on which the successive rows of cutting projections are at sufficient distance from each other, part of the surface between the rows of teeth or pins may guide and support the film strip between the passing of two successive rows, thus reducing the vibration of the latter. Such an arrangement is shown in cross section in FIGURE 6, in which roll 10 with rows of teeth 12 supports passing film strip 13 with its cylindrical surface at 14 over a contact angle alpha. The contact angle is usually between 10 and 45°. If the cylindrical roll has $n$ rows of cutting projections, the radius of the circular diameter of the roll is $r$ and the angle of contact is alpha, the condition that the film should be in contact with only one row of cutting projections can only be met if the height of the cutting projections above the cylinder surface is less than $$r\left[\cos\frac{1}{2}\left(\frac{360}{n}-\text{alpha}\right)-1\right]$$

The same effect may be obtained, if instead of a cylindrical roll a rotating prism with many lateral planes, e.g., 8 or more, is used. In that case, edges provided with teeth for fibrillation should alternate with smooth edges for guidance and support.

A number of knives or rows of pins may also be fitted on an endless band or belt running over rolls or wheels.

The film strip which is treated in accordance with the invention is suitably guided over the rotating cutting projections by means of guide rolls. When passing over the cutting device, the film strip is usually subject to tension in the direction of the transport. Increasing this tension may contribute to the effect of the treatment, but usually the tension sufficient for preventing visible deflection is satisfactory. Preferably the tension should be in the range of 0.5 to 2 g./denier.

Usually film strips are subject to the treatment with the serrated edges only at one film surface. The film strips may be treated, however, by serrated edges from both sides. In the latter case the crimping or curling effect caused by sharp rims, if any, in the notches is much smaller that if the treatment is effected from one side only, as the rims acting at both sides of the film counteract each other. However, such counteraction may in some cases be desirable; by suitable selection of the conditions of treatment from either side of the film, the crimping may be regulated at will.

The fibrillated, and in some cases crimped, products obtained in accordance with the invention have a fine, regular, reticulated structure, by virtue of which they are very useful for the manufacture of filaments, yarns, and other textile goods.

In one mode of practicing this invention, use is made of heated knives. Also the film may be heated to a temperature below its melting point before contacting the knives. The crimping effect obtained with heated knives and/or heated film strips, after cooling the fibrillated product back to the ambient temperature, may be more intense and more stable than the crimping obtained without such heating.

So far the invention has been explained primarily for the case in which the cutting projections protruding from the moving body are teeth of serrated knives. Instead of such teeth, pins not forming part of knives may be used, arranged in rows similar to the above-described serrated edges. What is said hereinbefore about sizes and shapes of teeth and distances between them in similar way also applies to the pins.

While it is preferred that the cutting projections actually cut, i.e., penetrate, the film at the point of contact, effective fibrillation may also be achieved if the cutting projections do not penetrate the film but scratch it sufficiently to leave visible scratch marks.

The process of the invention may be applied generally to all predominantly (i.e., more than 50% by weight) crystalline thermoplastic films that can be oriented uniaxially by stretching. Very good results have been obtained with polymers or copolymers of olefins such as polypropylene and polyethylene. The process may be applied also to polyamides, for instance nylons), polyesters, for instance polyglycol terephthalate, and the polymers of pivalolactone, polyvinylchloride and polyvinylidene chloride.

The process of the invention may also be applied to laminated films. A laminate comprising two layers, the stress-elongation curves of which do not coincide can be converted into a crimped fibrous product by stretching and subsequent fibrillating without the treatment of the present invention as described in Netherlands patent application 6612238 published Mar. 1, 1968. According as the treatment of the present invention would be applied to one side of the laminate or to the other, the crimping effect in the fibrillate would be increased or decreased, respectively.

The invention also relates to an apparatus which can be defined as comprising an assembly of parallel rows of cutting projections such as teeth or pins, said rows being adapted to move in a closed path, the rows being arranged substantially perpendicular to the direction of motion, and means for guiding a film strip closely along a part of said path such that the film strip is in contact with at most two rows of cutting projections at a time. Preferred arrangements in the apparatus have been described hereinbefore when dealing with the process.

EXAMPLE I

A film of prevailingly isotactic polypropylene (melt index 1.5) was extruded, 5 cm. wide and 0.05 mm. thick. It was stretched in a ratio 1:10, by passing it through an oven at 150° C., the velocities of the film when entering into the oven and when leaving it being 5 and 50 m./min. respectively. The stretched film was 16 mm. wide and 0.016 mm. thick.

The film was guided by rolls over an assembly of serrated knives fitted on an axle. The arrangement was such that the teeth of the knives penetrated the film.

Figure 7:
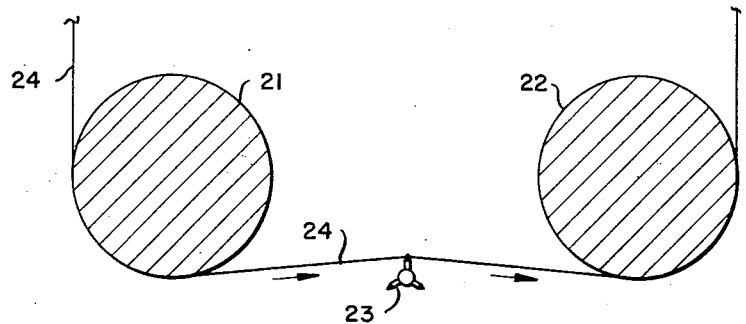
FIGURE 7 is a schematic diagram of apparatus suitable for practicing this invention.
Figure 8A:
Figure 8B:
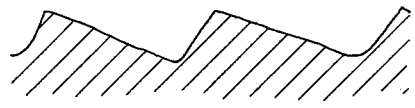
Figure 8C:
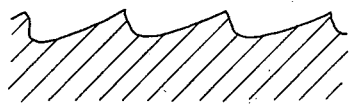
Figure 8D:
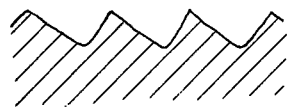

The arrangement of knives and guide rolls is shown in FIGURE 7 in schematic cross section perpendicular to the axes of rotation of the rolls. The rolls are marked 21 and 22, the knife assembly 23, and the film 24. The distance over which the film was unsupported between the rolls was 20 cm. The gross cross section of each knife was as shown in FIGURE 1c. On each knife the lateral planes at either side of the serrated edge met at an angle of 60°. The length of the serrated edge was 10 cm.

The speed of the film when hit by the knives was 50 m./min. The speed of the serrated edges was 200 or 300 m./min. in different runs. Four different shapes of teeth were used, shown in FIGURES 8a–d, in cross section in a plane through the tops of the teeth and the center of the axis of rotation. With teeth a, b, and c, the assembly consisted of three knives, with teeth d, four knives. The distance between the tops of the teeth and the center of the axis of rotation for knives 8a, b, c, and d was 5.3, 7.0, 7.6, and 4.4 mm., respectively. The spacing between teeth was 0.5, 1.0, 0.6, and 0.5 mm., respectively.

The results are collected in the following table.

| Teeth type | Speed of teeth, m/min. | Fiber thickness (mm.) | | Mesh length (mm.) | |
|---|---|---|---|---|---|
| | | Largest | Smallest | Largest | Smallest |
| 8a | 200 | 0.17–0.245 | 0.004–0.009 | 5–8 | 0.34–0.44 |
| 8a | 300 | 0.15–0.19 | 0.005–0.010 | 4.5–6 | 0.30–0.56 |
| 8b | 200 | 0.24–0.32 | 0.008–0.011 | 8–10 | 0.34–0.44 |
| 8c | 200 | 0.28–0.34 | 0.006–0.008 | 8–10 | 0.46–0.62 |
| 8d | 200 | 0.30–0.42 | 0.006–0.010 | 4.5–6.5 | 0.38–0.62 |
| 8d | 300 | 0.27–0.34 | 0.006–0.011 | 6–8 | 0.3–0.5 |

In all cases some crimping was observed. The finer the fibrils were, the more they crimped. The crimping could be increased by heating the film to 130° C. before contacting the teeth. A crimping of up to 3 crimps/cm. was observed for the finer fibrils.

EXAMPLE II

A film of prevailingly isotactic polypropylene (melt index 1.5) was extruded and immediately afterwards cooled in a water bath. After trimming at the edges it was 20 cm. wide and 0.05 mm. thick. The film was stretched in a ratio 1:8, by passing it through an oven at 130° C. The velocities of the material when entering into the oven and when leaving it were 8 and 64 m./min. respectively. The stretched film was 70 mm. wide and 0.018 mm. thick.

The stretched film, moving at 64 m./min., was fibrillated by contact with rows of pins on a rotating cylindrical roll, 10 cm. wide, diameter 1.2 cm., circumferential velocity 220 m./min. The cylindrical roll was provided with 6 straight rows of conical pins, parallel to the axis, at equal distances from each other. Each pin extended 0.8 mm. from the cylinder surface. The cross section of each pin at the surface of the cylindrical roll was 0.3 mm. in width. In each row there were 13 pins per centimeter. The points of the pins cut the film during contact. The angle over which the film was in contact with the cylindrical surface (alpha in FIGURE 3) was 17°.

For comparison, another experiment was carried out with a roll on which the pins were equally distributed, with 25 pins per cm.$^2$, all other conditions being the same as described in the preceding paragraph.

The following results were obtained:

| | Experiment of invention | Experiment of comparison |
|---|---|---|
| Average length of fiber (mm.) | 7 | 6 |
| Average thickness of fiber (mm.) | 0.018 | 0.018 |
| Average width of fiber (mm.) | 0.215 | 0.460 |
| Average percent by weight of fibrillated material of width: | | |
| Above 0.50 mm | <1 | 26 |
| Above 0.30 mm | <5 | 93 |

It is evident from these figures that the fibrillation in accordance with the invention is more complete and more uniform than with the apparatus used for comparison.

We claim as our invention:

1. Process for the fibrillation of thermoplastic film which comprises passing a band thereof, having substantially uniaxial orientation in the lengthwise dimension, into brief contact with cutting projections which are arranged in rows at substantially right angle to the direction of film movement and move at from 2 to 10 times the speed of the film in the direction of film movement at the point of contact, said rows carrying from 5 to 100 fixed projections per centimeter, simultaneous contact being limited to no more than two rows of cutting projections, said contact resulting in at least partial penetration of said projections into the film.

2. Process according to claim 1 in which the rows of cutting projections are the serrated edges of knives, having notches not exceeding 0.5 mm. in width.

3. Process according to claim 2 in which the rows of cutting projections consist of teeth alternating with sharp rims at substantially right angles to the direction of motion of the film strip, whereby a crimping effect is exerted upon the fibrillating material.

4. Process according to claim 1 in which the cutting projections are mounted on a rotating body and in which part of the surface of said body between the row of cutting projections which just lost contact with the fibrillated film and the row of cutting projections which is just about to hit the film is in contact with the fibrillating material.

5. Apparatus comprising an assembly of parallel rows of from 5 to 100 fixed cutting projections per centimeter, said rows being adapted to move in a closed path and being arranged perpendicular to the direction of motion, and means for guiding a film strip closely along a part of said path and into contact with said cutting projections, said rows being spaced such that no more than two rows of cutting projections are in contact with said strip at one time.

6. Apparatus as claimed in claim 5 in which said cutting projections extend from a rotating cylindrical roll.

7. Apparatus as claimed in claim 5 in which said cutting projections extend from the edges of a rotating prism.

8. Apparatus as claimed in claim 5 in which said rows of cutting projections are serrated edges of knives having notches not exceeding 0.5 mm. in width and teeth alternating with sharp rims at substantially right angles to said direction of motion.

References Cited

UNITED STATES PATENTS 3,273,771  9/1966  Beaumont _____ 225—3
3,302,501  2/1967  Greene _____ 83—2
3,336,174  8/1967  Dyer et al.

LOUIS K. RIMRODT, Primary Examiner

U.S. Cl. X.R.

23—2; 28—72, 72.13; 225—3; 264—147